US009162357B2

(12) United States Patent
Ito (10) Patent No.: US 9,162,357 B2
(45) Date of Patent: Oct. 20, 2015

(54) CONTROL METHOD FOR ROBOT SYSTEM AND ROBOT SYSTEM (71) Applicant: CANON KABUSHIKI KAISHA, Tokyo (JP)

(72) Inventor: Keisuke Ito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/305,798

(22) Filed: Jun. 16, 2014

(65) Prior Publication Data

US 2015/0005936 A1 Jan. 1, 2015

(30) Foreign Application Priority Data

Jun. 26, 2013 (JP) ................................. 2013-134034

(51) Int. Cl.
B25J 9/10 (2006.01)
B25J 9/16 (2006.01)

(52) U.S. Cl.
CPC ................ *B25J 9/163* (2013.01); *Y10S 901/01* (2013.01); *Y10S 901/14* (2013.01)

(58) Field of Classification Search
CPC ........ B25J 9/0096; B25J 9/1628; B25J 9/163; B25J 9/1656; B25J 9/1661; B25J 9/1664; B25J 9/1669; B25J 9/1674; B25J 9/1679; B25J 9/1682; B25J 9/1692
USPC ................................................. 700/254, 255
See application file for complete search history.

(56) References Cited

U.S. PATENT DOCUMENTS

| 5,821,984 | A | | 10/1998 | Ito et al. | |
|---|---|---|---|---|---|
| 5,912,540 | A | * | 6/1999 | Kosaka et al. | 318/568.14 |
| 5,914,755 | A | | 6/1999 | Ito et al. | |
| 5,996,094 | A | | 11/1999 | Ito | |
| 6,163,124 | A | * | 12/2000 | Ito et al. | 318/567 |
| 6,356,806 | B1 | * | 3/2002 | Grob et al. | 700/245 |
| 2003/0040840 | A1 | * | 2/2003 | Hirayama et al. | 700/245 |
| 2004/0133312 | A1 | * | 7/2004 | Watanabe et al. | 700/264 |
| 2007/0211395 | A1 | * | 9/2007 | Svensson et al. | 361/23 |
| 2010/0057251 | A1 | * | 3/2010 | Ikushima | 700/245 |

FOREIGN PATENT DOCUMENTS

JP 7-164285 A 6/1995

* cited by examiner

*Primary Examiner* — Stephen Holwerda
(74) *Attorney, Agent, or Firm* — Fitzpatrick, Cella, Harper & Scinto (57) ABSTRACT Provided is a control method for a robot system including: working units; and a robot having unit related processes that include moving between two of the working units and executing work. The control method includes: determining, in a case of detecting a first working unit that has come into a work required condition, whether an operation of the robot is stopped on a way from a current position to a position of a second working unit; stopping the operation of the robot on the way if determining that the operation of the robot is stopped on the way; and selecting a unit related process corresponding to a working unit other than the first working unit, moving the robot until the robot arrives at a position, and stopping the operation of the robot at the position, if determining that the operation of the robot is not stopped on the way.

8 Claims, 10 Drawing Sheets

| 28a | 28b | 28c | |
|---|---|---|---|
| | ABNORMALITY UNIT | POSITION OF ROBOT TO BE STOPPED | PROCESS NUMBER WHERE POSITION OF ROBOT TO BE STOPPED IS STARTED POSITION |
| PROCESS 4 | A UNIT | P1 | P1: PROCESS 1 |
| | B UNIT | P5 | P5: PROCESS 5 |
| | C UNIT | P110 | — |
| | D UNIT | P110 | — |

CONTROL METHOD FOR ROBOT SYSTEM AND ROBOT SYSTEM

BACKGROUND OF THE INVENTION

1. Field of the Invention

The present invention relates to a control method for a robot system when an abnormality in a working unit that performs predetermined work is detected, and a robot system including the same.

2. Description of the Related Art

An articulated robot supplies a workpiece, and a working unit automatically performs predetermined work on the supplied workpiece. Generally, in such a case, if an abnormality occurs in the work performed by the working unit, the entire system is stopped, and a worker performs recovery work of the system. In the recovery work of the system, for example, the worker solves the occurring abnormality, then returns the system to an initial state thereof, and restarts the system. This requires enormous time. Hence, up to now, a robot system (robot apparatus) capable of recovery in a short time from abnormality occurrence has been desired.

Under the circumstances, Japanese Patent Application Laid-Open No. H07-164285 proposes a robot apparatus. In the robot apparatus, an operation of an articulated robot at the time of abnormality occurrence is stored, and the articulated robot is restarted from the stored operation after the worker solves the abnormality, whereby the recovery time is shortened.

Unfortunately, in the robot apparatus proposed in Japanese Patent Application Laid-Open No. H07-164285, when the entire apparatus is stopped based on abnormality detection, the articulated robot may be an obstacle to a working unit in which the abnormality occurs, depending on the stopped position of the articulated robot, and the abnormality may be difficult to solve. Further, in this case, an abnormality solving process is performed by moving the articulated robot using a teaching pendant. Hence, after the abnormality is solved, the articulated robot needs to be returned to an operation started position, and the recovery time increases.

SUMMARY OF THE INVENTION

The present invention has an object to provide a control method for an articulated robot capable of shortening the recovery time in such a condition that work by a worker is required, and a robot system including the same.

The present invention provides a control method for a robot system including: a plurality of working units that is placed at different positions in a work area and performs predetermined work; and a robot to which a plurality of unit related processes is set, the unit related processes including moving between respective two of the plurality of working units and executing work corresponding to each of the plurality of working units. The control method includes: determining, in a case of detecting a first working unit that has come into a work required condition in which work by a worker is required, whether or not an operation of the robot is stopped on a way from a current position of the robot to a position of a second working unit corresponding to a unit related process to be next executed by the robot; stopping the operation of the robot on the way from the current position of the robot to the position of the second working unit, if determining that the operation of the robot is stopped on the way from the current position of the robot to the position of the second working unit; and selecting a unit related process corresponding to a working unit other than the first working unit, from among the plurality of unit related processes, moving the robot until the robot arrives at a position of the working unit corresponding to the selected unit related process, and stopping the operation of the robot at the position of the working unit, if determining that the operation of the robot is not stopped on the way from the current position of the robot to the position of the second working unit.

The present invention further provides a robot system including: a plurality of working units that is placed at different positions in a work area and performs predetermined work; a robot to which a plurality of unit related processes is set, the robot moving between respective two of the plurality of working units and executing work corresponding to each of the plurality of working units; a detection unit that detects a first working unit that has come into a work required condition in which work by a worker is required; a determination unit that determines, in a case where the detection unit detects the first working unit, whether or not an operation of the robot is stopped on a way from a current position of the robot to a position of a second working unit corresponding to a unit related process to be next executed by the robot; and a control device configured to: immediately stop the operation of the robot on the way from the current position of the robot to the position of the second working unit, if the determination unit determines that the operation of the robot is stopped on the way from the current position of the robot to the position of the second working unit; or select a unit related process corresponding to a working unit other than the first working unit, from among the plurality of unit related processes, move the robot until the robot arrives at a position of the working unit corresponding to the selected unit related process, and stop the operation of the robot at the position of the working unit, if the determination unit determines that the operation of the robot is not stopped on the way from the current position of the robot to the position of the second working unit.

According to the present invention, the recovery time in such a condition that work by a worker is required can be shortened.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereinafter, an assembly apparatus 100 as a robot system according to an embodiment of the present invention is described with reference to FIG. 1 to FIG. 12B. First, an overall schematic configuration of the assembly apparatus 100 according to the embodiment of the present invention is described with reference to FIG. 1 to FIG. 9.

Figure 1:
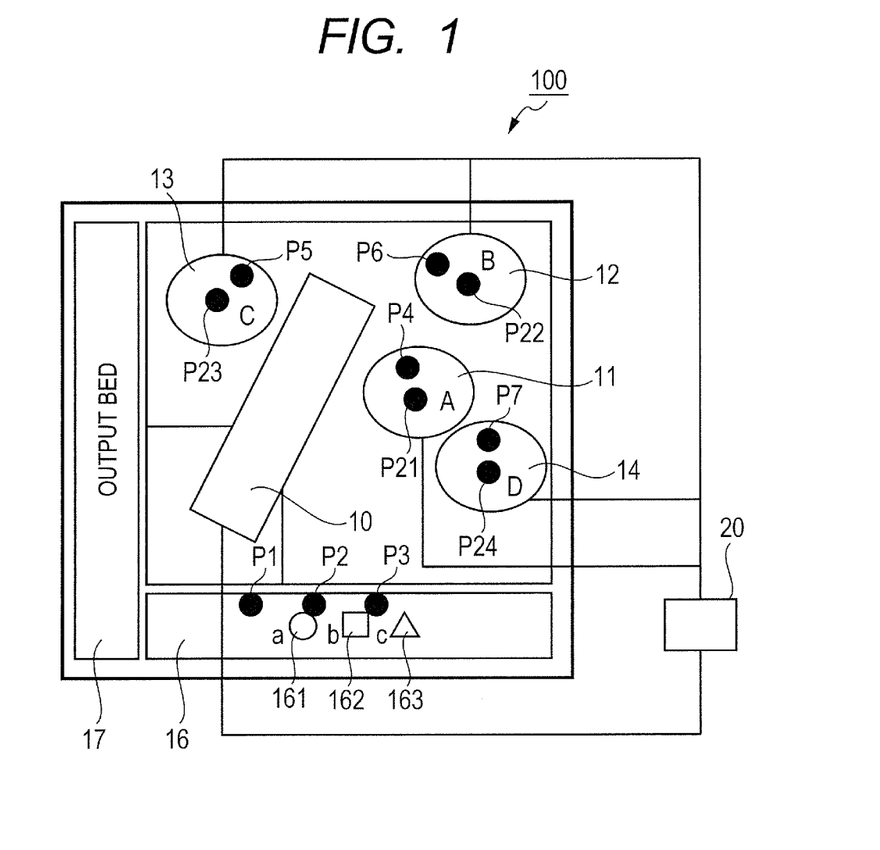
FIG. 1 is a plan view schematically illustrating an assembly apparatus according to an embodiment of the present invention.
Figure 2:
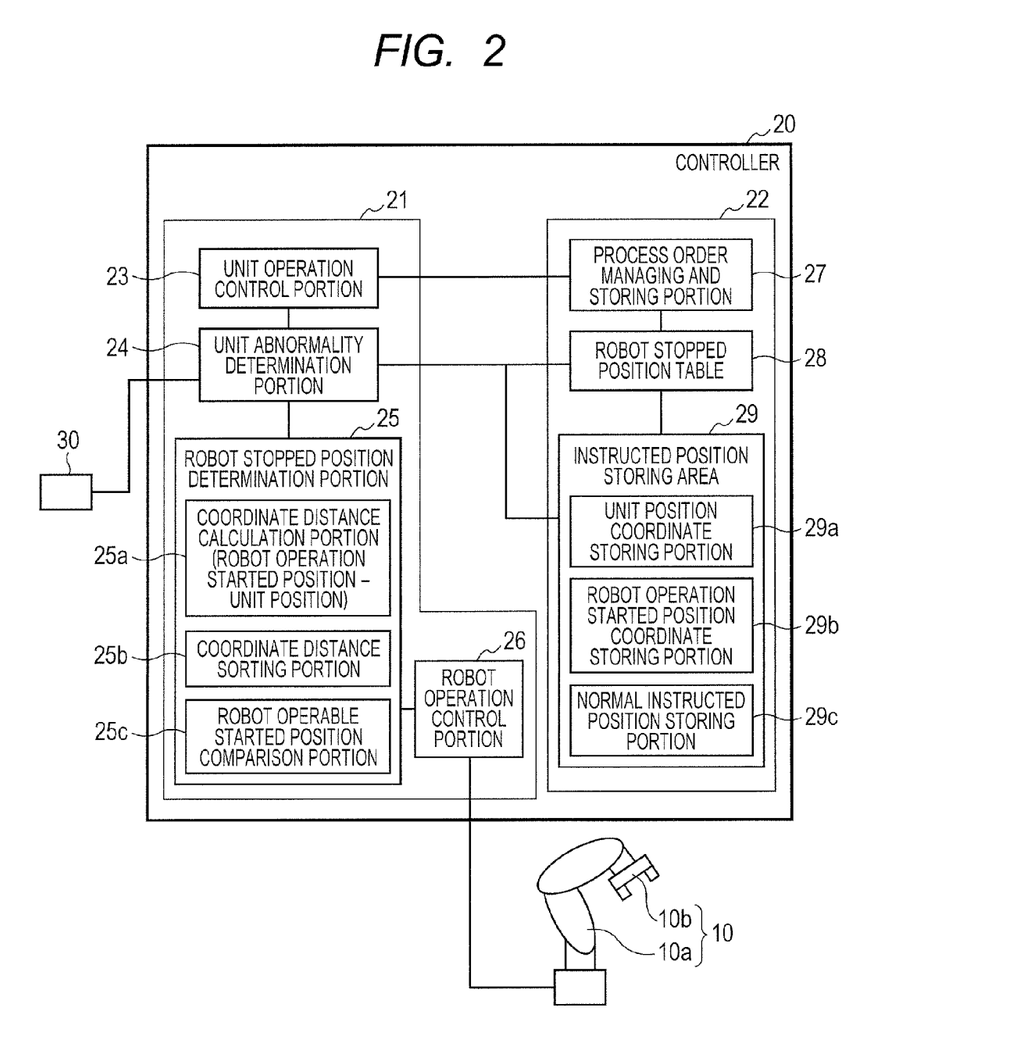
FIG. 2 is a block diagram illustrating a configuration of a controller of the assembly apparatus according to the present embodiment.
Figure 3:
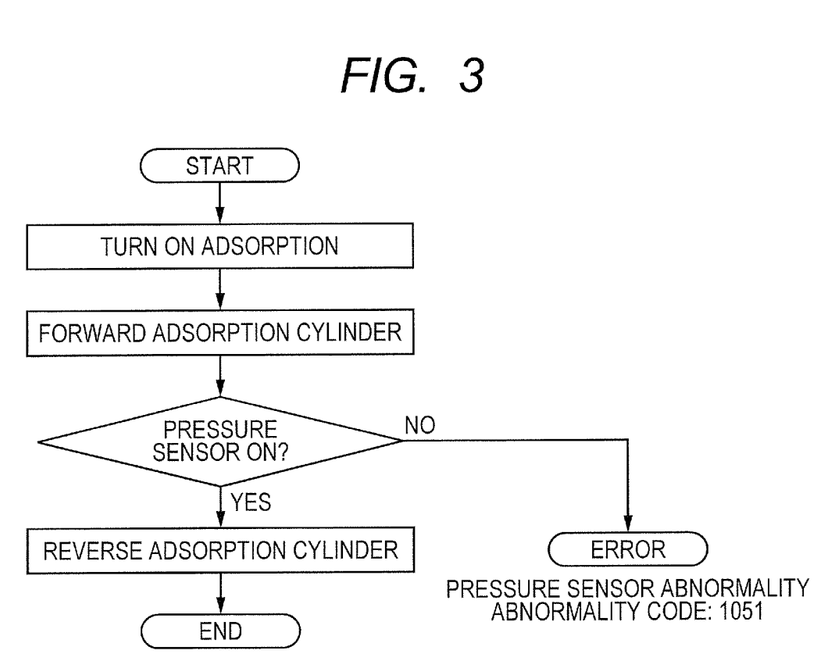
FIG. 3 is a flow chart of a unit operation control portion according to the present embodiment.
Figure 4:
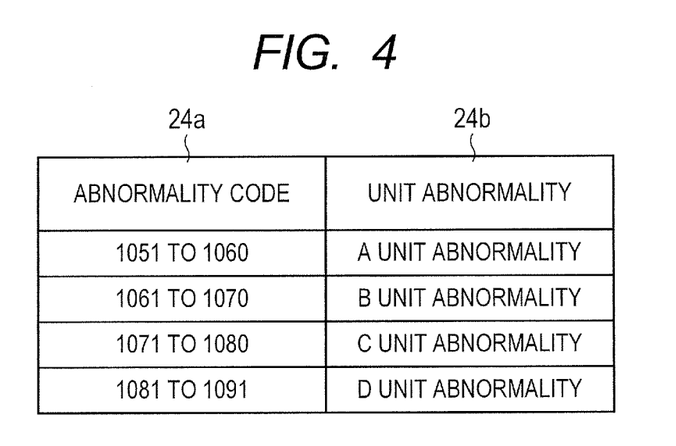
FIG. 4 is a diagram illustrating an abnormality determination table of a unit abnormality determination portion according to the present embodiment.
Figure 5:
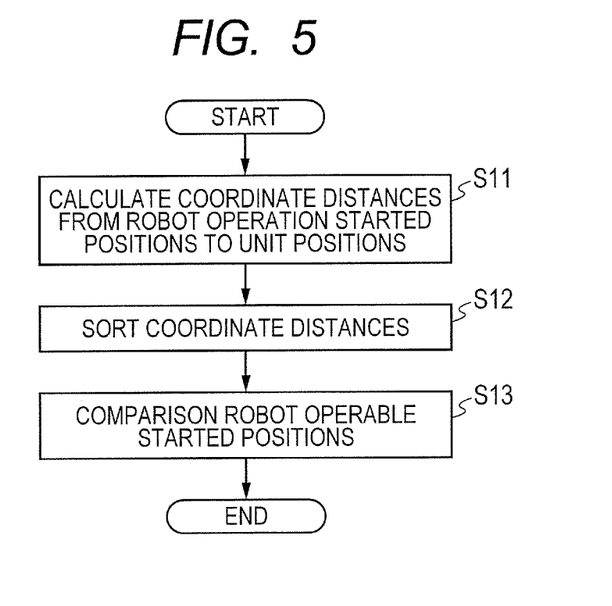
FIG. 5 is a flow chart of a robot stopped position determination portion according to the present embodiment.
Figure 6:
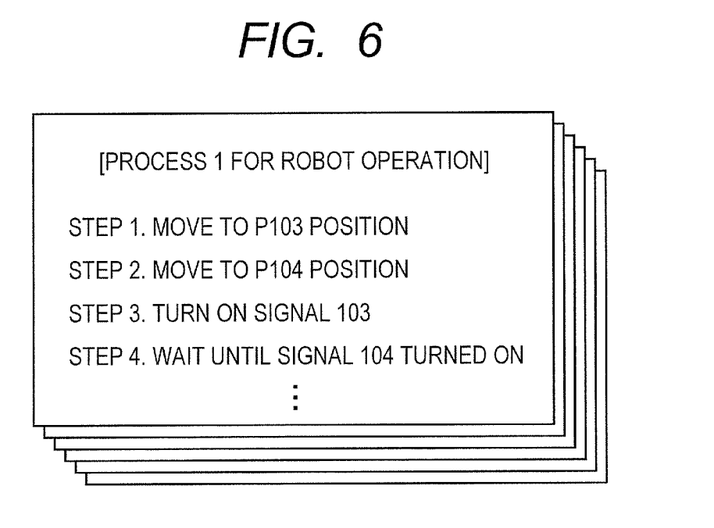
FIG. 6 is a diagram illustrating a control program of a robot operation control portion according to the present embodiment.
Figure 7:
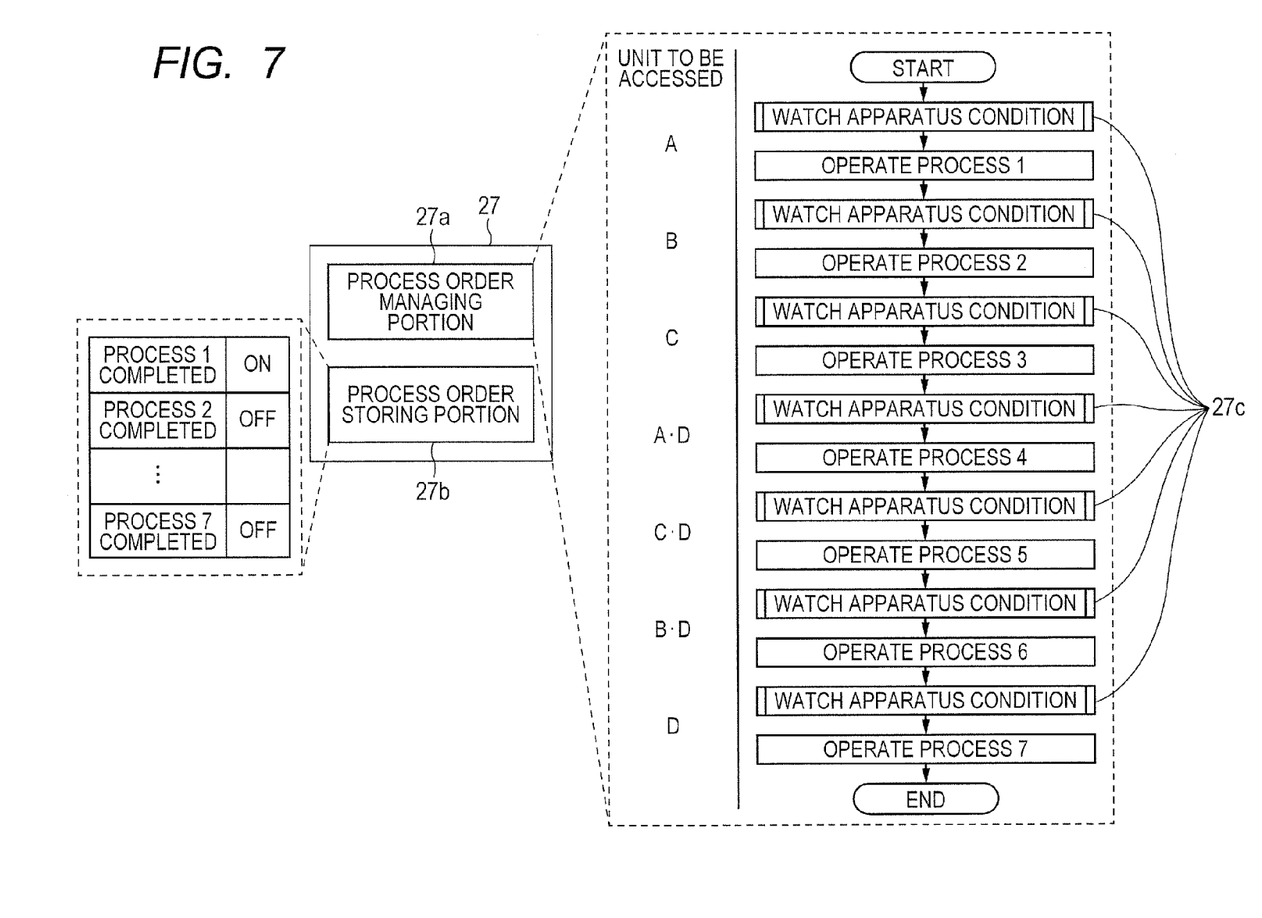
FIG. 7 is a block diagram illustrating a configuration of a process order managing and storing portion according to the present embodiment.
Figure 8:
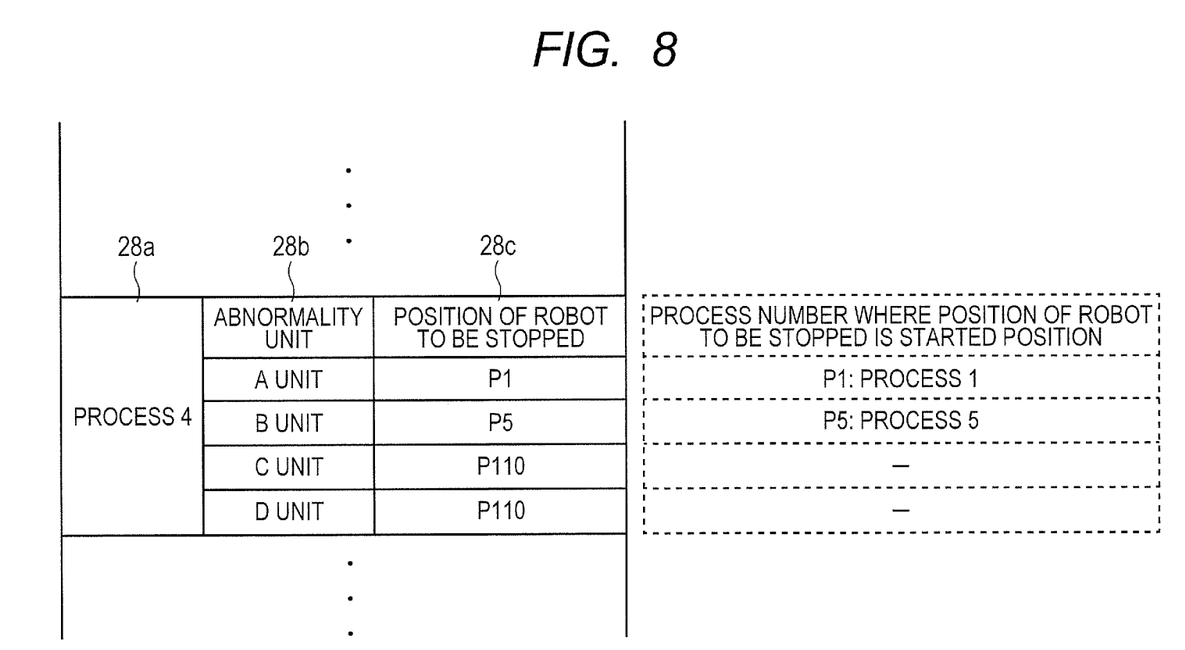
FIG. 8 is a diagram illustrating a robot stopped position table according to the present embodiment.
Figure 9:
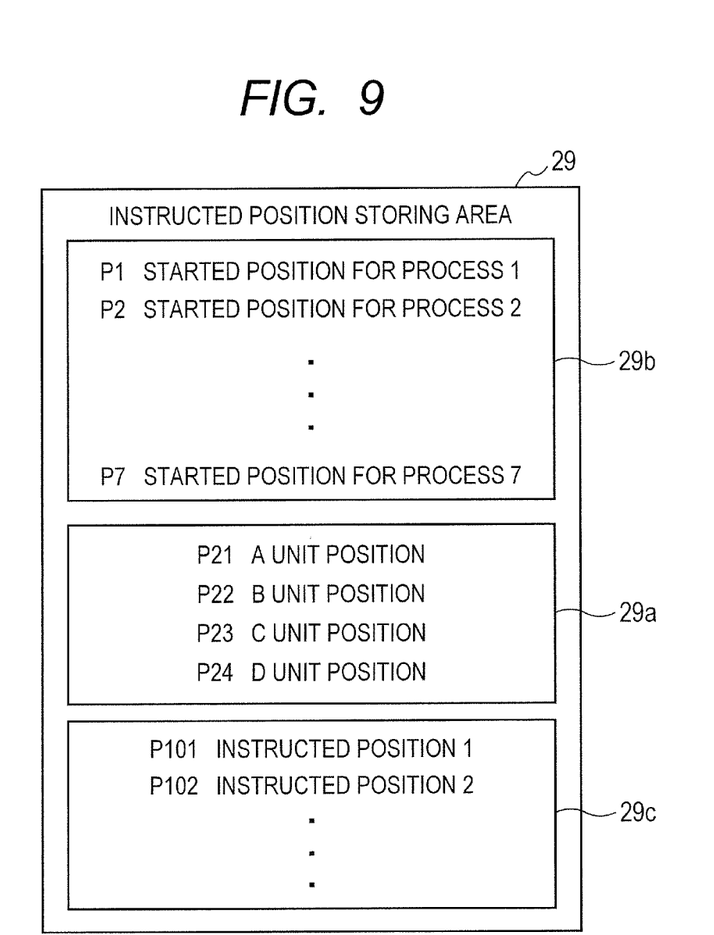
FIG. 9 is a block diagram illustrating a configuration of an instructed position storing area according to the present embodiment.

FIG. 1 is a plan view schematically illustrating the assembly apparatus 100 according to the embodiment of the present invention. FIG. 2 is a block diagram illustrating a configuration of a controller 20 of the assembly apparatus 100 according to the present embodiment. FIG. 3 is a flow chart of a unit operation control portion according to the present embodiment. FIG. 4 is a diagram illustrating an abnormality determination table of a unit abnormality determination portion 24 according to the present embodiment. FIG. 5 is a flow chart of a robot stopped position determination portion 25 according to the present embodiment. FIG. 6 is a diagram illustrating a control program of a robot operation control portion 26 according to the present embodiment. FIG. 7 is a block diagram illustrating a configuration of a process order managing and storing portion 27 according to the present embodiment. FIG. 8 is a diagram illustrating a robot stopped position table 28 according to the present embodiment. FIG. 9 is a block diagram illustrating a configuration of an instructed position storing area 29 according to the present embodiment.

As illustrated in FIG. 1 and FIG. 2, the assembly apparatus 100 includes: a six-axis vertical articulated robot (hereinafter, referred to as "articulated robot") 10; an A working unit 11; a B working unit 12; a C working unit 13; a D working unit 14; and a part supply pedestal 16 on which each supplied part (workpiece) is mounted. The A working unit 11 to D working unit 14 automatically perform predetermined work. The assembly apparatus 100 further includes: an output bed 17 on which a part that has been subjected to the work is mounted; a detection unit 30 capable of detecting an abnormality in each of the A working unit 11 to D working unit 14; and the controller (control device) 20 that controls these components.

Note that the abnormality in this case refers to such a condition that work by a worker is required (work required condition), and includes, for example, breakdown of the working units themselves and work failures (such as an incorporation failure and an attachment failure).

The articulated robot 10 includes a six-axis articulated robot arm 10a, a hand (end effector) 10b connected to the distal end of the robot arm 10a, and a force sensor (not illustrated) capable of detecting force acting on the hand 10b. The articulated robot 10 grasps a part with the hand 10b, and drives an actuator built in the robot arm 10a, to thereby move and mount the part onto a predetermined working unit. At this time, the articulated robot 10 moves the part while causing the force sensor to detect force acting on the robot arm 10a and the hand 10b.

The A working unit 11 to D working unit 14 are respectively provided at different positions on a work pedestal, and perform predetermined work on the part moved and mounted by the articulated robot 10 and/or the articulated robot 10, based on a command from the controller 20, independently of an operation of the articulated robot 10. For example, the A working unit 11 to D working unit 14 incorporate parts and attach seals.

Note that instructed positions P1 to P7 illustrated in FIG. 1 are robot operation started position coordinates in processes (Processes 1 to 7 to be described later), and instructed positions P21 to P24 are unit position coordinates. Further, in the present embodiment, an a part 161, a b part 162 and a c part 163 are mounted on the part supply pedestal 16, and the a part 161, the b part 162 and the c part 163 are given to the A working unit 11 to D working unit 14 by the articulated robot 10 according to each process.

As illustrated in FIG. 2, the controller 20 includes a CPU 21 and a memory 22. Note that the controller 20 may include a programmable logic controller and a robot controller. The CPU 21 includes a unit operation control portion 23, a unit abnormality determination portion 24, a robot stopped position determination portion 25 and a robot operation control portion 26. The memory 22 includes a process order managing and storing portion 27, a robot stopped position table 28 and an instructed position storing area 29.

The unit operation control portion 23 controls operations of the A working unit 11 to D working unit 14. Specifically, as illustrated in FIG. 3, the unit operation control portion 23 includes coded operation order (routine) of the A working unit 11 to D working unit 14 as well as coded possible errors and codes (abnormality codes) thereof. Then, the unit operation control portion 23 operates the A working unit 11 to D working unit 14 in the operation order. If an abnormality occurs, the unit operation control portion 23 transmits the corresponding abnormality code to the unit abnormality determination portion 24, and stops the A working unit 11 to D working unit 14.

If an abnormality occurs in any of the working units in the apparatus, the unit abnormality determination portion 24 determines in which working unit of the A working unit 11 to D working unit 14 the abnormality occurs. In the present embodiment, the unit abnormality determination portion 24 includes an abnormality determination table illustrated in FIG. 4, in which an abnormality code 24a and a unit number 24b are associated with each other. If an abnormality occurs in any of the working units, the unit abnormality determination portion 24 refers to the abnormality determination table, analyzes in which working unit the abnormality occurs, based on the corresponding abnormality code, and transmits the analysis result to the robot stopped position table 28.

The robot stopped position determination portion 25 determines whether or not the operation of the robot is immediately stopped. That is, the robot stopped position determination portion 25 determines whether or not the operation of the robot is stopped on the way to the position of a working unit corresponding to a process to be next executed by the robot. The robot stopped position determination portion 25 includes a coordinate distance (from robot operation started position to unit position) calculation portion 25a, a coordinate distance sorting portion 25b and a robot operable started position comparison portion 25c. When the robot stopped position determination portion 25 determines that the operation of the robot is not immediately stopped, that is, determines that the operation of the robot is not stopped on the way to the position of the working unit corresponding to the process to be next executed by the robot, a stopped position of the articulated robot 10 at the time of abnormality occurrence is determined by means of the coordinate distance (from robot operation started position to unit position) calculation portion 25a, coordinate distance sorting portion 25b and robot operable started position comparison portion 25c.

Specifically, the coordinate distance (from robot operation started position to unit position) calculation portion 25a calculates distances between two points from all combinations of coordinate values registered in a robot operation started position coordinate storing portion 29b and coordinates registered in a unit position coordinate storing portion 29a (see S11, FIG. 5). Then, according to the calculation results, the coordinate distance sorting portion 25b sorts, for each process, the distances of the robot operation started positions from each working unit in descending order (S12). Subsequently, the robot operable started position comparison portion 25c refers to a process order managing portion 27a, and determines whether or not the robot can be moved to the robot operation started position that is calculated for each process by the coordinate distance sorting portion 25b as being the farthest from the abnormality unit, at the time of abnormality occurrence (S13). If the robot cannot be moved thereto, the robot operable started position comparison portion 25c determines whether or not the robot can be moved to the robot operation started position next farthest from the abnormality unit.

The assembly apparatus 100 according to the present embodiment may further include, as one of the working units, a retraction unit for retracting the articulated robot 10 above the work pedestal. In this case, if a started position of the robot to be stopped corresponds to a robot started position of a process for accessing the abnormality unit, the robot operable started position comparison portion 25c replaces the started position of the robot to be stopped with a unit retraction position corresponding to a retraction unit as another working unit. The unit retraction position may be stored in any memory, and the number thereof may be more than one. In the present embodiment, the unit retraction position is defined as P101 stored in a normal instructed position coordinate storing portion 29c, and the result is transmitted to the robot stopped position table 28.

The robot operation control portion 26 controls an operation (motion) of the articulated robot 10 for each process. For example, the robot operation control portion 26 receives an instruction for a process to be operated, from the process order managing and storing portion 27, and issues a command about a process and an operation corresponding to the information to the articulated robot 10. The operation is executed according to a process operation program (see FIG. 6) written in a robot language. The articulated robot 10 operates as the robot operation control portion 26 commands. Upon reception of a robot stop command from the process order managing and storing portion 27, the robot operation control portion 26 stops the robot at the position of the robot stop command.

The process order managing and storing portion 27 stores which of processes in the A working unit 11 to D working unit 14 is performed, and manages a process to be performed depending on a condition of the entire apparatus. Specifically, as illustrated in FIG. 7, the process order managing and storing portion 27 includes the process order managing portion 27a and a process order storing portion 27b. The process order managing portion 27a is a portion in which the process order of the apparatus and which working unit to be accessed by the articulated robot 10 for each process are registered. Further, the process order managing portion 27a has a function of activating, upon activation of the apparatus, an apparatus condition watching subroutine 27c before the start of each process and then giving operation instructions to the articulated robot 10 and the A working unit 11 to D working unit 14. The process order storing portion 27b stores up to which process the operation has been performed. For example, if the operation in Process 1 is ended, the process order storing portion 27b turns on a Process 1 completion flag, and saves information thereof.

The robot stopped position table 28 stores information in which, when an abnormality occurs in any of the A working unit 11 to D working unit 14, the abnormality in the working unit, a position of the robot to be stopped and stop possibility determination information are associated with one another. Specifically, the robot stopped position table 28 is linked to the unit abnormality determination portion 24, the process order managing and storing portion 27 and the robot stopped position determination portion 25. Further, as illustrated in FIG. 8, the robot stopped position table 28 includes a process stopped position storing area 28a, an abnormality unit list 28b and a position of the robot to be stopped 28c. The positions calculated by the robot stopped position determination portion 25 are stored in the position of the robot to be stopped 28c for each process, and are respectively associated with the corresponding abnormality units.

The instructed position storing area 29 stores instructed position coordinates of the articulated robot 10. Specifically, as illustrated in FIG. 9, the instructed position storing area 29 includes the unit position coordinate storing portion 29a, the robot operation started position coordinate storing portion 29b and the normal instructed position coordinate storing portion 29c. For example, as for by the instructed position storing area 29, one memory in the instructed position storing area 29 has three divided areas. Then, P1 to P7 are defined as the robot operation started position coordinate storing portion 29b, P21 to P24 are defined as the unit position coordinate storing portion 29a, and the others are defined as the normal instructed position coordinate storing portion 29c. Position coordinates are stored in each of these portions. Note that memories of the robot operation started position coordinate storing portion 29b, the unit position coordinate storing portion 29a and the normal instructed position coordinate storing portion 29c may be configured in three regions.

Figure 10:
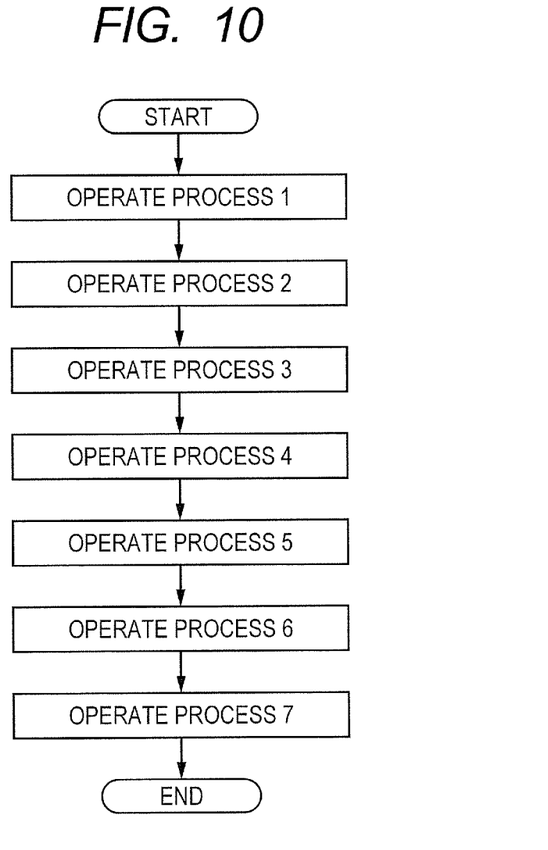
FIG. 10 is a flow chart of a plurality of process operations of the assembly apparatus according to the present embodiment.

Hereinafter, an operation of the assembly apparatus 100 according to the present embodiment is described with reference to FIG. 10 to FIG. 12B. First, a plurality of work processes given in advance and a routine (work procedure) set in advance based on the plurality of work processes are described with reference to FIG. 10. FIG. 10 is a flow chart of a plurality of process operations of the assembly apparatus 100 according to the present embodiment.

As illustrated in FIG. 10, an assembly process of the assembly apparatus 100 according to the present embodiment includes seven processes, which are executed based on the routine set in advance. In the present embodiment, Process 1 to Process 7 are sequentially executed. Contents of each process to be executed are as described below.

In Process 1, according to a command from the robot operation control portion 26, the articulated robot 10 obtains the a part 161 from the part supply pedestal 16, and moves and mounts the a part 161 onto the A working unit (work corresponding to a unit, a unit related process). Then, according to a command from the unit operation control portion 23, the A working unit 11 performs a processing operation on the a part

161. In Process 2, according to a command from the robot operation control portion 26, the articulated robot 10 obtains the b part 162 from the part supply pedestal 16, and moves and mounts the b part 162 onto the B working unit 12 (work corresponding to a unit, a unit related process). Then, according to a command from the unit operation control portion 23, the B working unit 12 performs a processing operation on the b part 162.

In the operation in Process 3, according to a command from the robot operation control portion 26, the articulated robot 10 obtains the c part 163 from the part supply pedestal 16, and moves and mounts the c part 163 onto the C working unit 13 (work corresponding to a unit, a unit related process). Then, according to a command from the unit operation control portion 23, the C working unit 13 performs a processing operation on the c part 163. In Process 4, according to a command from the robot operation control portion 26, the articulated robot 10 obtains the processed a part 161 from the A working unit 11, and moves and mounts the processed a part 161 onto the D working unit (work corresponding to a unit, a unit related process). In Process 5, according to a command from the robot operation control portion 26, the articulated robot 10 obtains the processed c part 163 from the C working unit 13, and moves and mounts the processed c part 163 onto the D working unit 14 (work corresponding to a unit, a unit related process).

In Process 6, according to a command from the robot operation control portion 26, the articulated robot 10 obtains the processed b part 162 from the B working unit 12, and moves and mounts the processed b part 162 onto the D working unit 14 (work corresponding to a unit, a unit related process). In Process 7, the D working unit 14 assembles the parts moved and mounted thereonto. Then, the articulated robot 10 moves and mounts the assembled parts onto the output bed 17 (work corresponding to a unit, a unit related process).

Figure 11:
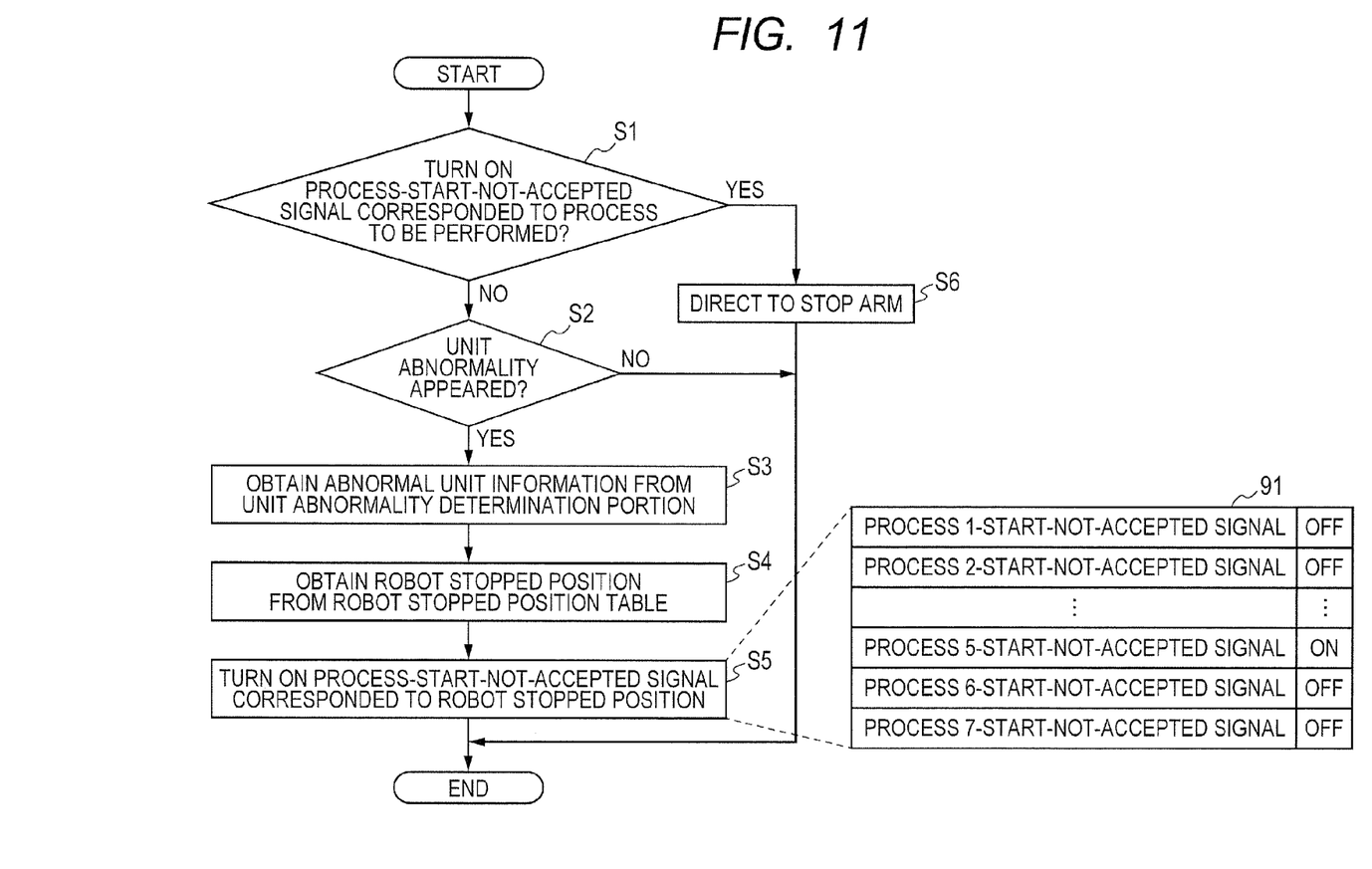
FIG. 11 is a flow chart of an apparatus condition watching subroutine according to the present embodiment.

Hereinafter, an operation of the assembly apparatus 100 (a control method for a robot system) when an abnormality in any of the A working unit 11 to D working unit 14 is detected by the detection unit 30 during execution of each process described above is described with reference to FIG. 11. FIG. 11 is a flow chart of the apparatus condition watching subroutine 27*c* according to the present embodiment.

The apparatus condition watching subroutine 27*c* is activated upon activation of the assembly apparatus 100. First, the apparatus condition watching subroutine 27*c* determines whether or not a stop signal (to be described later) is set (Step S1). If the stop signal is set, the apparatus condition watching subroutine 27*c* proceeds to Step S6. If the stop signal is not set, the apparatus condition watching subroutine 27*c* proceeds to Step S2. Subsequently, the apparatus condition watching subroutine 27*c* determines whether or not an abnormality occurs in any of the A working unit 11 to D working unit 14 (Step S2). If the abnormality does not occur in any of the A working unit 11 to D working unit 14, the apparatus condition watching subroutine 27*c* is ended. If the abnormality occurs therein, the apparatus condition watching subroutine 27*c* proceeds to Step S3.

Subsequently, the apparatus condition watching subroutine 27*c* obtains information as to in which unit the abnormality is found in Step S2 (Step S3). After obtaining the information, the apparatus condition watching subroutine 27*c* proceeds to Step S4. Subsequently, the apparatus condition watching subroutine 27*c* determines whether or not the operation of the robot is immediately stopped. That is, the apparatus condition watching subroutine 27*c* determines whether or not the operation of the robot is stopped on the way to the position of a working unit corresponding to a unit related process to be next executed by the robot. If determining that the operation of the robot is not immediately stopped, that is, determining that the operation of the robot is not stopped on the way to the position of the working unit corresponding to the unit related process to be next executed by the robot, the apparatus condition watching subroutine 27*c* obtains a robot stopped position from the robot stopped position table 28, based on the result in Step S3 and the process being currently performed (Step S4). Subsequently, the apparatus condition watching subroutine 27*c* sets a stop signal corresponding to a process where the robot stopped position is the robot operation started position, to a start-not-accepted signal table 91 (Step S5). Upon reception of the stop signal, the apparatus condition watching subroutine 27*c* transmits the stop signal to the articulated robot 10 and the articulated robot 10 is stopped.

Figure 12A:
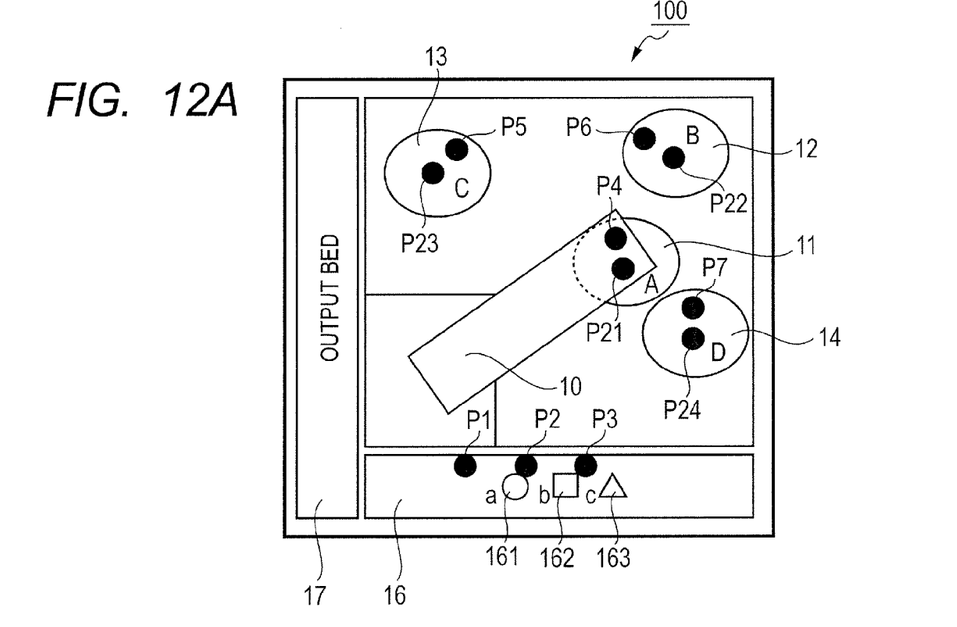
FIG. 12A is a plan view schematically illustrating a condition of the assembly apparatus at the time of abnormality occurrence.
Figure 12B:
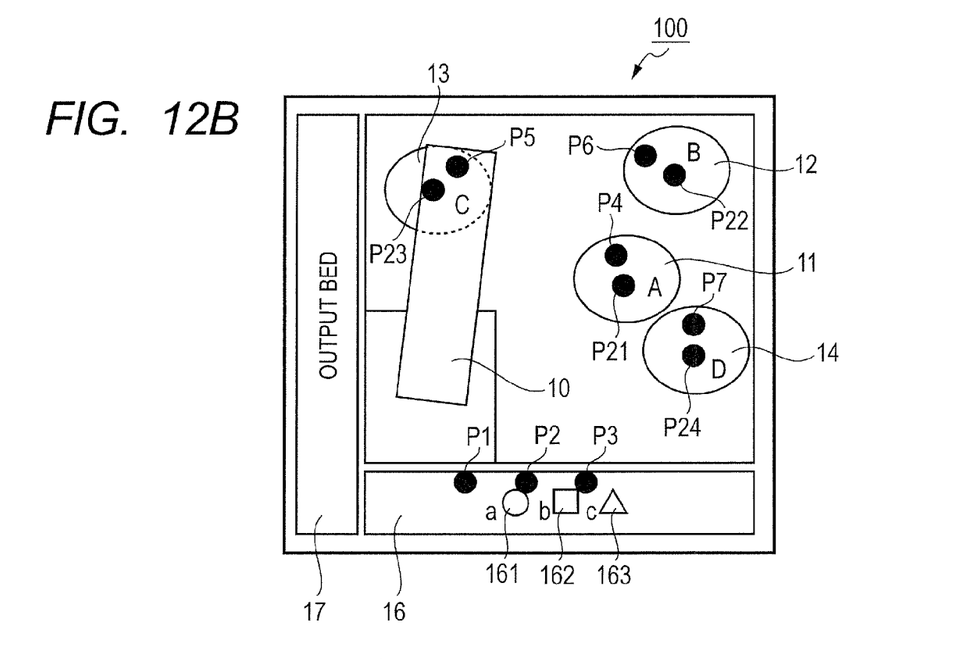
FIG. 12B is a plan view schematically illustrating the condition of the assembly apparatus at the time of the abnormality occurrence.

Hereinafter, an operation at the time of unit abnormality occurrence in a system design of the assembly apparatus 100 according to the present embodiment is described with reference to FIG. 12A and FIG. 12B. FIG. 12A and FIG. 12B are plan views each schematically illustrating a condition of the assembly apparatus 100 at the time of the abnormality occurrence.

First, process order and which working unit to be accessed by the articulated robot 10 for each process are registered in the process order managing and storing portion 27. Subsequently, robot operation started coordinates and unit positions are registered in the instructed position storing area 29. After the registration, the robot stopped position determination portion 25 is activated upon activation of the assembly apparatus 100, and the robot stopped position table 28 is created. In the present embodiment, because the number of processes is seven and the number of working units is four, 28 tables are created as the robot stopped position table 28.

It is assumed here that, during the operation in Process 4 illustrated in FIG. 12A, the detection unit 30 detects an abnormality in the B working unit 12, and an abnormality flow (apparatus condition watching subroutine 27*c*) is started. Consequently, an abnormality code is transmitted from the unit operation control portion 23 to the unit abnormality determination portion 24. The unit abnormality determination portion 24 identifies in which working unit the abnormality occurs, based on the transmitted abnormality code.

Subsequently, a position of the robot to be stopped is obtained from the robot stopped position table 28. According to the robot stopped position table 28 illustrated in FIG. 8, the position of the robot to be stopped is the instructed position P5. This is because Process 5 is a unit related process at the position that is the farthest from the B working unit 12 on the way to the next arrival at a unit related process (Process 6) corresponding to the B working unit 12, and hence the unit related process is thus executed up to Process 5 (unit related process selection process). Note that, although the position farthest from the B working unit 12 is the instructed position P1, the robot is moved to the instructed position P1 in Process 1, and hence the instructed position P1 is excluded by the robot stopped position determination portion 25 in this case.

Subsequently, if the operation proceeds to Process 5 (the robot is moved to the instructed position P5) according to the process order registered in the process order managing and storing portion 27, the robot operation control portion 26 outputs a stop command to the articulated robot 10, and the articulated robot 10 is stopped at the instructed position P5 as illustrated in FIG. 12B (robot stop process).

As described above, in the assembly apparatus 100 according to the present embodiment, if the detection unit detects an abnormality, the articulated robot 10 is stopped at the position (different position) of the unit related process farthest from the working unit in which the abnormality occurs. The assembly apparatus 100 according to the present embodiment may further include, as one of the working units, a retraction unit for retracting the articulated robot 10 above the work pedestal. In this case, the articulated robot 10 is moved between the working units other than the retraction unit and the retraction unit, and executes work corresponding to the retraction unit (work corresponding to a unit, a unit related process). Then, if the detection unit 30 detects an abnormality and if the robot stopped position determination portion 25 determines that the operation of the articulated robot 10 is not stopped on the way from the current position of the articulated robot 10 to the position of a working unit corresponding to a unit related process to be next executed by the robot, the robot operation control portion 26 moves the articulated robot 10 to the unit retraction position, and stops the articulated robot 10 thereat. In this way, the worker can easily access the working unit in which the abnormality occurs. This can avoid, for example, moving the articulated robot using a teaching pendant and a jog and then performing work. As a result, the time required from detection of the abnormality to the work recovery can be shortened.

Further, because the articulated robot 10 is stopped in a predetermined unit related process, the articulated robot 10 can immediately return to the process after the worker performs an abnormality solving process. Accordingly, the recovery time can be further shortened.

Hereinabove, the embodiment of the present invention has been described, but the present invention is not limited to the above-mentioned embodiment. Further, the effects described in the embodiment of the present invention are mere example effects produced by the present invention, and effects of the present invention are not limited to the effects described in the embodiment of the present invention.

For example, the present embodiment is described by way of a cell manufacturing system in which one articulated robot and first to fourth working units perform a plurality of types of work above one pedestal, but the present invention is not limited thereto. For example, the present invention can also be applied to a cell manufacturing system including a plurality of robot stations each including one articulated robot and at least one working unit. In this case, the articulated robot in any of the robot stations in which an abnormality is detected is stopped in conditions similar to the above-mentioned conditions.

Further, in the present embodiment, the articulated robot is a vertical articulated robot, but the articulated robot may be a horizontal articulated robot (SCARA robot) and a parallel link robot.

Further, processing operations in the present embodiment are executed by the CPU 21 of the controller 20. Accordingly, a recording medium having a control program for implementing the above-mentioned functions recorded therein may be supplied to the controller 20, and a computer (CPU, MPU) of the controller 20 may read and execute the control program recorded in the recording medium, whereby the processing operations may be achieved. In this case, because the program itself read out of the recording medium implements the functions of the above-mentioned embodiment, the program itself and the recording medium having the program recorded therein are included in the present invention.

Further, in the present embodiment, a computer-readable recording medium is the memory 22, and the control program is stored in the memory 22, but the present invention is not limited thereto. The control program may be recorded in any recording medium as long as the recording medium is readable by the computer. Examples of the recording medium for supplying the program include a ROM, an external storage device, and a recording disk. Specific examples of the recording medium include a flexible disk, a hard disk, an optical disk, a magneto-optical disk, a CD-ROM, a CD-R, a magnetic tape, a non-volatile memory card, and a ROM. Further, the program in the present embodiment may be downloaded via a network to be executed by the computer.

Further, the functions of the present embodiment are not limitatively implemented by only executing a program code read by the computer. The present invention also includes the case where an operating system (OS) running on the computer performs the entirety or part of actual processing based on an instruction of the program code and where the functions of the above-mentioned embodiment are implemented by the processing.

Moreover, the program code read out of the recording medium may be written into a memory provided in one of a function expansion board inserted in the computer and a function expansion unit connected to the computer. The present invention also includes the case where a CPU provided in one of the function expansion board and the function expansion unit performs the entirety or part of actual processing based on an instruction of the program code and where the functions of the present embodiment are implemented by the processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-134034, filed Jun. 26, 2013, which is hereby incorporated by reference herein in its entirety.

What is claimed is:

1. A control method for a robot system including: a plurality of working units that is placed at different positions in a work area and performs predetermined work; and a robot to which a plurality of unit related processes is set, the unit related processes including moving between respective two of the plurality of working units and executing work corresponding to each of the plurality of working units, the control method comprising:

determining, in a case of detecting a first working unit that has come into a work required condition in which work by a worker is required, whether or not an operation of the robot is stopped on a way from a current position of the robot to a position of a second working unit corresponding to a unit related process to be next executed by the robot;

stopping the operation of the robot on the way from the current position of the robot to the position of the second working unit, if determining that the operation of the robot is stopped on the way from the current position of the robot to the position of the second working unit; and selecting a unit related process corresponding to a working unit other than the first working unit, from among the plurality of unit related processes, moving the robot until the robot arrives at a position of the working unit corresponding to the selected unit related process, and stopping the operation of the robot at the position of the working unit, if determining that the operation of the robot is not stopped on the way from the current position of the robot to the position of the second working unit.

2. The control method according to claim 1, wherein the selecting the unit related process corresponding to the working unit other than the first working unit includes selecting, in the case of the detecting of the first working unit, a unit related process corresponding to a working unit at a position that is the farthest from a position of the first working unit on a way to next arrival at the position of the first working unit.

3. The control method according to claim 1, wherein
the moving the robot until the robot arrives at the position of the working unit corresponding to the selected unit related process and stopping the operation of the robot at the position includes continuing work of the robot until the robot arrives at the position of the working unit at which the selected unit related process is to be executed.

4. The control method according to claim 1, wherein
the plurality of working units includes a retraction unit for retracting the robot in the work area,
the plurality of unit related processes includes moving between the working units other than the retraction unit and the retraction unit and executing work corresponding to the retraction unit,
the selecting the unit related process corresponding to the working unit other than the first working unit, from among the plurality of unit related processes, includes selecting a unit related process corresponding to the retraction unit, and
the moving the robot until the robot arrives at the position of the working unit corresponding to the selected unit related process and stopping the operation of the robot at the position includes moving the robot until the robot arrives at a position of the retraction unit and stopping the operation of the robot at the position of the retraction unit.

5. A robot system comprising:
a plurality of working units that is placed at different positions in a work area and performs predetermined work;
a robot to which a plurality of unit related processes is set, the robot moving between respective two of the plurality of working units and executing work corresponding to each of the plurality of working units;
a detection unit that detects a first working unit that has come into a work required condition in which work by a worker is required;
a determination unit that determines, in a case where the detection unit detects the first working unit, whether or not an operation of the robot is stopped on a way from a current position of the robot to a position of a second working unit corresponding to a unit related process to be next executed by the robot; and
a control device configured to:
immediately stop the operation of the robot on the way from the current position of the robot to the position of the second working unit, if the determination unit determines that the operation of the robot is stopped on the way from the current position of the robot to the position of the second working unit; or
select a unit related process corresponding to a working unit other than the first working unit, from among the plurality of unit related processes, move the robot until the robot arrives at a position of the working unit corresponding to the selected unit related process, and stop the operation of the robot at the position of the working unit, if the determination unit determines that the operation of the robot is not stopped on the way from the current position of the robot to the position of the second working unit.

6. The robot system according to claim 5, wherein
the control device selects a unit related process corresponding to a working unit at a position that is the farthest from the first working unit on a way to next arrival at a unit related process corresponding to the first working unit, moves the robot to the position of the working unit at the farthest position, and stops the operation of the robot at the position of the working unit, if the determination unit determines that the operation of the robot is not stopped on the way from the current position of the robot to the position of the second working unit.

7. The robot system according to claim 5, wherein
the control device controls the robot to continue work of the robot until the robot arrives at the position of the working unit at which the selected unit related process is to be executed, if the determination unit determines that the operation of the robot is not stopped on the way from the current position of the robot to the position of the second working unit.

8. The robot system according to claim 5, wherein
the plurality of working units includes a retraction unit for retracting the robot in the work area,
the robot moves between the working units other than the retraction unit and the retraction unit, and executes work corresponding to the retraction unit, and
the control device selects a unit related process corresponding to the retraction unit, moves the robot until the robot arrives at a position of the retraction unit, and stops the operation of the robot at the position of the retraction unit, if the determination unit determines that the operation of the robot is not stopped on the way from the current position of the robot to the position of the second working unit.

* * * * *